United States Patent Office 3,356,766
Patented Dec. 5, 1967

3,356,766
PRESSURE-SENSITIVE ADHESIVE COMPRISING ATACTIC POLYPROPYLENE
Richard E. Ware, Trainer, Pa., assignor to Sun Oil Company, Philadelphia, Pa., a corporation of New Jersey
No Drawing. Filed May 5, 1965, Ser. No. 453,493
4 Claims. (Cl. 260—897)

ABSTRACT OF THE DISCLOSURE

A hot melt composition that is pressure sensitive is prepared from about 75 to 85 wt. percent atactic polypropylene and 15 to 25 wt. percent of a terpene resin such as alpha- or beta-pinene. The composition is applied to a substrate, for example, paper, in the form of a melt and allowed to cool. The resulting area of the substrate coated with the composition is now a pressure-sensitive adhesive. The composition bearing substrate can now be bonded to various other materials including paper, aluminum foil, polypropylene film and cellophane by the mere application of light pressure by hand.

---

This invention relates to a pressure-sensitive hot melt adhesive. More particularly, it has been found that when the hot melt compositions of the present invention are applied to a suitable backing or substrate, as hereinafter described, they provide pressure-sensitive adhesive materials.

Hot melt adhesives produce a bond in the backing or substrate by simple cooling as distinguished from cross-linking or other chemical reactions. Prior to heating, the compositions of the present invention are thermoplastic solid materials. Upon heating, they melt rather sharply, flow freely and are easily applied to the substrate. The substrate containing the pressure-sensitive adhesive may be applied to other substrates or materials to form a quick wetting, good pressure-sensitive bond.

The substrates suitable for application of the hot melt compositions include paper, cellophane, plastic, textiles, wood and other materials. The substrate containing the pressure-sensitive adhesive compositions may be applied to cellophane, plastic and other materials to produce a good pressure-sensitive bond.

A pressure-sensitive adhesive must remain tacky after it has been applied and set on the carrier substrate, for long periods of time, incident to storage and ultimate use. A second property of pressure-sensitive adhesives is good peel strength. In addition to the desirable properties of the pressure-sensitive adhesive, the melt point, setting time, pot life and general handling qualities of the hot melt composition in automatic machinery are essential requirements.

An object of the present invention is to provide a low-cost pressure-sensitive adhesive composition.

Another object of the present invention is to provide a pressure-sensitive adhesive composition with high performance qualities.

A further object of the present invention is to provide a pressure-sensitive adhesive composition that is easily applied to the carrier substrate or backing.

I have found that the objects of the present invention can be obtained with a hot melt adhesive composition that is obtained by blending atactic polypropylene and a terpene resin. The hot melt compositions of the present invention can be applied, for example, to paper, cellophane or plastic tape and upon setting produce tapes containing a pressure-sensitive adhesive. The tapes containing the pressure-sensitive adhesive may be stored in rolls from which the tape is dispensed as needed. The tapes are useful for mending and marking plastics and for closing and sealing plastic containers. The hot melt compositions may be applied directly to packages, such as those made from polypropylene and polyethylene films, which can be sealed after filling the package by simply pressing the adhesive-containing section of the package against the uncoated film.

Since the hot melt composition is applied directly to the substrate, no solvent is necessary in order to get the adhesive on the carrier substrate as was often required in prior adhesives.

The atactic (essentially non-crystalline) polypropylene is formed during the stereospecific polymerization of propylene. The polymerization takes place in the presence of a catalyst comprising a coordination complex of a transition metal halide with an organometallic compound. The atactic polypropylene usually represents from about 5 to 15 weight percent of the polymerization product, the remainder being isotactic (essentially crystalline) polypropylene. The solid atactic polypropylene suitable of the composition of the invention has a molecular weight of 15,000 to 60,000 and more particularly from 16,000 to 20,000. It is soluble in boiling pentane, hexane, heptane and other hydrocarbons.

In one known process, the polymerization product in the reaction medium is contacted with a solvent consisting of methanol and water to kill the catalyst. The catalyst is then removed in solution leaving a heptane slurry. The atactic polypropylene is in solution in the heptane, and this solution is removed from the isotactic polymer. The solution is distilled to recover the heptane solvent which is recycled. The solid material which remains is the atactic polypropylene employed in the compositions of this invention. Suitable atactic polypropylene is available commercially, such as "Oletac 100" produced by Avisun Corporation.

TABLE I

*Properties of atactic polypropylene "Oletac 100" employed*

Molecular wt. _____ 16,000 to 20,000.
Viscosity cps. at 300° F. _____ 4,200 to 5,800.
Ring and ball, ° C. _____ 115 to 121.
Intrinsic viscosity [n] _____ .28.

The terpene resins suitable for the compositions of the instant invention include both the alpha- and the beta-pinene resins. The terpene resins are commercially available, such as "Piccolyte S–115" and "Piccolyte AX–115." Either alpha- or beta-pinene resins having a molecular weight of about 1200 and ring and ball melt point of about 115° C. are employed.

In one known procedure for producing the terpene resins, the pinene is diluted with a refined hydrocarbon solvent, such as a naphtha cut and contacted with a Friedel-Crafts catalyst. After the initial heat evolution reactions have subsided, an additional contacting period with the catalyst is provided. The catalyst is removed by successive washings with water and dilute aqueous alkali and separation of the aqueous and hydrocarbon phases. The hydrocarbon phase is then subjected to high temperature and steam distillation. The pinene resin for the present invention remains in the stillpot.

Properties of "Piccolyte" are as follows:

TABLE II

|  | Piccolyte S-115 β-Pinene resin | Piccolyte AX-115 α-Pinene resin |
|---|---|---|
| Ring and Ball Melt Point, °C | 115 | 115 |
| Bromine No | 3-5 | 15-20 |
| Density at 15.5° C | 0.980 | 0.980 |
| Color Gardner Scale | 1-3 | 5-6 |
| Molecular Weight | ca. 1,200 | ca. 1,200 |

The hot melt adhesive is made by thoroughly mixing the ingredients at a temperature in the range of 200° F. to 300° F.

The compositions of the invention preferably contain 75 to 85 wt. percent atactic polypropylene and 15 to 25 wt. percent of a terpene resin, selected from the group consisting of α-pinene and β-pinene resins.

For application to a surface, the adhesive is heated to a temperature in the range of 250° F. to 350° F. and applied to the surface of the substrate in any suitable manner.

The following examples are given to illustrate the invention and not to limit its scope.

EXAMPLE I 80 grams of atactic polypropylene containing 8 grams of 2,6-ditert-butyl-4-methyl phenol (antioxidant) were blended in a Sigma blade mixer with 20 grams of α-pinene resin at about 302° F. until a homogeneous melt was obtained. The hot melt was applied to a one inch square area in the center of a 1 x 3 inch strip of 50 pound kraft paper and allowed to cool in a dust-free environment. The adhesive containing strips were then applied to 1 x 3 inch strips of untreated kraft paper, aluminum foil, polypropylene and cellophane and pressure applied by hand to make the bond. The strips were then tested as described below for peel strength and shear strength.

EXAMPLE II

As a comparison, 100 grams of atactic polypropylene containing 1 gram of BHT antioxidant were heated to 250° F. to form a hot melt from which test strips as in Example I were prepared and tested.

The test was performed on a Tinius-Olsen tensile tester using a separation rate of two inches per minute.

The peel test is conducted by securing one strip and attaching a pulling arm to one end of the second substrate so that the second substrate is pulled perpendicular to the adhesive layer. When the tester is activated, it records the grams necessary to course a failure of the bond at the rate of two inches per minute across the one inch (2.5 cm.) width of the adhesive area.

The shear strength is determined by securing one end of one substrate and attaching the opposite end of the other substrate to the pulling arm. When the tester is activated, it records the grams required to shear the one inch (2.5 cm.) square adhesive area along the axis of the two bonded strips at the rate of 2 inches per minute. The results of the test are set out below.

TABLE III

| Substrate to which the kraft paper containing adhesive is bonded | Peel Strength, grams/cm. | | Shear Strength, grams/cm.$^2$ | |
|---|---|---|---|---|
| | Atactic Polypropylene | Atactic Polypropylene and α-pinene resin | Atactic Polypropylene | Atactic Polypropylene and α-pinene resin |
| Paper | 0 | 0 | 0 | 457 |
| Aluminum foil | 36 | 216 | 974 | 755 |
| Polypropylene | 216 | 666 | 444 | 458 |
| Cellophane | 54 | 700 | 546 | 380 |

The addition of terpene resins to atactic polypropylene substantially increases the peel strength of the pressure-sensitive bonds, while essentially retaining the high shear resistance of the base atactic polypropylene.

In addition to the atactic polypropylene and terpene resins, the hot melt pressure-sensitive adhesive composition may contain function ingredients such as antioxidants, coloring agents, plasticizers and the like.

The invention claimed is:

1. A thermoplastic, pressure-sensitive hot melt adhesive composition consisting essentially of a homogeneous mixture of a major proportion of atactic polypropylene having a molecular weight of 15,000 to 60,000, and a minor proportion of a terpene resin having a molecular weight of about 1200.

2. A thermoplastic, pressure-sensitive hot melt adhesive composition consisting essentially of 75 to 85 wt. percent atactic polypropylene having a molecular weight of 15,000 to 60,000, and 15 to 25 wt. percent of terpene resin having a molecular weight of about 1200.

3. Composition according to claim 2 wherein the terpene resin is selected from the group consisting of α-pinene and β-pinene resins.

4. A thermoplastic, pressure-sensitive hot melt adhesive composition consisting essentially of 75 to 85 wt. percent atactic polypropylene having a molecular weight of 16,000 to 20,000 and 15 to 25 wt. percent terpene resin selected from the group consisting of α-pinene and β-pinene resins having a molecular weight of about 1200, said adhesive being characterized as producing a pressure-sensitive bond when a substrate containing said adhesive is applied to another substrate.

References Cited

UNITED STATES PATENTS

| 3,220,966 | 11/1965 | Flanagan | 260—897 |
| 3,247,142 | 4/1966 | Brunson et al. | 260—897 |
| 3,253,059 | 5/1966 | Vollmer | 260—897 |
| 3,258,340 | 6/1966 | Riboni | 96—87 |
| 3,261,820 | 7/1966 | Natta et al. | 260—93.5 |

MURRAY TILLMAN, Primary Examiner.

T. G. FIELD, Jr., Assistant Examiner.